(12) United States Patent
Schechter

(10) Patent No.: US 9,384,564 B2
(45) Date of Patent: Jul. 5, 2016

(54) RENDERING OF DATA SETS COMPRISING MULTIPLE-RESOLUTION SAMPLES

(75) Inventor: Greg D. Schechter, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2065 days.

(21) Appl. No.: 11/941,993

(22) Filed: Nov. 19, 2007

(65) Prior Publication Data

US 2009/0128560 A1    May 21, 2009

(51) Int. Cl.
G06T 11/00    (2006.01)

(52) U.S. Cl.
CPC ........... *G06T 11/001* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 6,088,035 A | 7/2000 | Sudarsky et al. | |
| 6,292,713 B1 * | 9/2001 | Jouppi et al. | 700/245 |
| 6,636,215 B1 | 10/2003 | Greene | |
| 2001/0043216 A1 | 11/2001 | Hoffman et al. | |
| 2004/0119709 A1 | 6/2004 | Strom et al. | |
| 2004/0212614 A1 | 10/2004 | Aila et al. | |
| 2005/0134588 A1 | 6/2005 | Aila et al. | |
| 2005/0253843 A1 * | 11/2005 | Losasso Petterson et al. | 345/428 |
| 2006/0170693 A1 | 8/2006 | Bethune et al. | |

FOREIGN PATENT DOCUMENTS

| | | |
|---|---|---|
| WO | 0137220 A1 | 5/2001 |
| WO | 2006115716 A2 | 11/2006 |

OTHER PUBLICATIONS

Batagelo, et al., "Dynamic Scene Occlusion Culling using a Regular Grid", pp. 43-50.
El-Sana, et al., "Integrating Occlusion Culling with View-Dependent Rendering", Date: Oct. 21-26, 2001, pp. 371-575.
Gyulassy, et al. "Time- and Space-efficient Error Calculation for Multiresolution Direct Volume Rendering", pp. 1-14.
Gruen, et al. "Modeling and Visualization of Landscape and Objects Using Multi-Resolution Image Data", pp. 1-6.

* cited by examiner

*Primary Examiner* — Said Broome
(74) *Attorney, Agent, or Firm* — Timothy Churna; Katherine Drakos; Micky Minhas

(57) ABSTRACT

A data set may be represented by samples of multiple resolutions, such as an image represented by pixels of various resolutions. When such multiple-resolution samples are potentially overlapping, it may be inefficient to render both a lower-resolution sample and also the plurality of higher-resolution samples that overlap the lower-resolution sample. Conversely, it may be more efficient to determine, before rendering a sample representing a particular data unit, whether the sample is overlapped by available higher-resolution samples that represent the same data unit. Techniques are disclosed for making this determination in an efficient manner, and for acting upon the determination to achieve improved efficiency in the rendering of the data set.

20 Claims, 11 Drawing Sheets

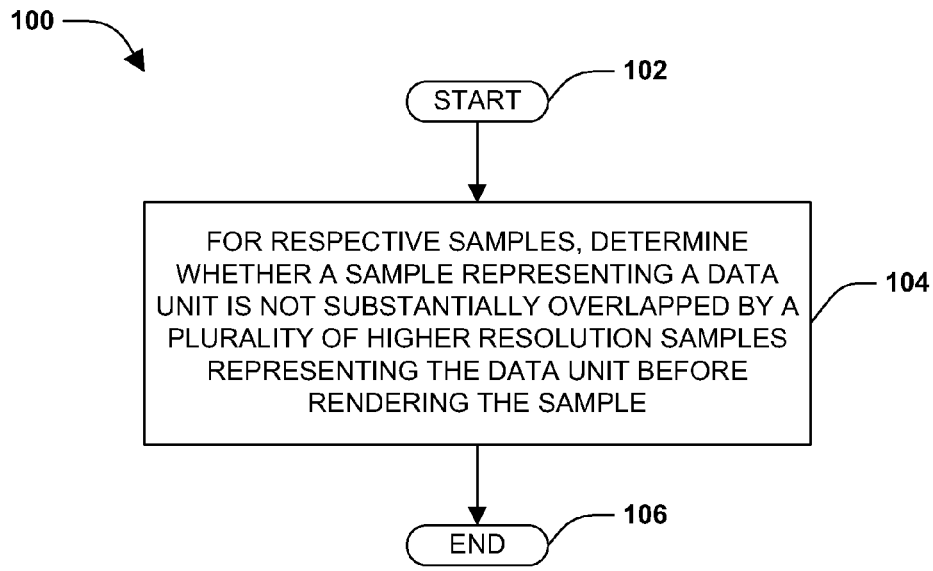

FIG. 2

```
void RenderObject(Sample[] dataset, float fSubstantialOverlapThreshold) {
   for each Sample sample in dataset {
      float fOverlap = 0.0;
      for each Sample sampleHigherResolution in dataset {
         if ((sampleHigherResolution.Resolution > sample.Resolution) &&
            (ComputeDataUnit(sample) == ComputeDataUnit(sampleHigherResolution))
               fOverlap = fOverlap + ComputeOverlap(sample, sampleHigherResolution);
      }
      if (fOverlap < fSubstantialOverlapThreshold)
         sample.Render();
   }
}
```

```
private void MarkTileAsPresent(int depth, int cellX, int cellY, bool isPresent)
{
    LevelInfo li = _levelInfos[depth];
    li.TileStatus.Set(LevelInfo.PresentBit, cellX, cellY, isPresent);
    CalculateOcclusion(depth, cellX, cellY, isPresent);
} private void CalculateOcclusion(int depth, int cellX, int cellY, bool isPresent)
{
    if (depth > 0)
    {
        // Calculate the group of 4 that this maps to a single tile in the level below it.
        int x0 = cellX % 2 == 0 ? cellX : cellX - 1;
        int x1 = cellX % 2 == 0 ? cellX + 1 : cellX;
        int y0 = cellY % 2 == 0 ? cellY : cellY - 1;
        int y1 = cellY % 2 == 0 ? cellY + 1 : cellY;

LevelInfo li = _levelInfos[depth];

// When a tile just became present or occluded, if all of its neighbors in its quadrant
        // also are present or occluded, then we can descend and mark the one below it as
occluded.
        bool shouldDescend = li.PresentOrOccluded(x0, y0) &&
                             li.PresentOrOccluded(x0, y1) &&
                             li.PresentOrOccluded(x1, y0) &&
                             li.PresentOrOccluded(x1, y1);
        if (!isPresent)
        {
            // But if the tile just was removed, or became unoccluded, it's exactly the opposite.
We
            // only descend to mark something unoccluded if it least one in the quadrant isn't
present
            // or occluded.
            shouldDescend = !shouldDescend;
        } if (shouldDescend)
        {
            // Entire quadrant is filled in or occluded, we can mark the one below us as
occluded...
            LevelInfo levelBelow = _levelInfos[depth - 1];
            int newX = x0 / 2;
            int newY = y0 / 2;
            levelBelow.TileStatus.Set(LevelInfo.OccludedBit, newX, newY, isPresent);

// ... and now check to see if the layer below that is occluded.
            CalculateOcclusion(depth - 1, newX, newY, isPresent);
        }
    }
}
```

FIG. 10

RENDERING OF DATA SETS COMPRISING MULTIPLE-RESOLUTION SAMPLES

BACKGROUND

Computer systems often deal with data sets composed of samples, such as the pixels of a bitmap image, the waveforms comprising the moments of an audio recording, or the recordings of a sensor device used in a technical setting. These samples are structured to provide quanta of information about the data set at a particular resolution, e.g., a bitmap comprising a 256-pixel-by-256-pixel block, where each pixel represents one color value. For a particular data set, e.g., a particular image, the resolution may be more coarsely or more finely defined. Higher-resolution data may portray the image with more information than lower-resolution data, but may also involve a greater volume of data to represent the image. For example, a particular data unit of a data set—e.g., a specific portion of a bitmap image—may be represented by higher-resolution samples, which provide more information but with more voluminous data, and also by lower-resolution samples, which provide less information but less voluminous data.

Computer systems may be configured to host multiple representations of a data set at various resolutions, e.g., both a low-resolution version of an image and a high-resolution version of the same image. In some instances, the computer systems may operate on a plurality of such data sets. For example, a computer system may fulfill a request for an image by providing a low-resolution version of the image. A user viewing the image may request to zoom in on a portion of the image, and the computer system may respond by accessing and illustrating the samples of the higher-resolution image comprising the zoomed-in portion of the image. The computer system may therefore operate on multiple-resolution samples of the data set while providing the service to the user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure presents techniques for processing multiple-resolution data sets to avoid inefficiencies relating to the processing of redundant data. While processing a data set (e.g., rendering an image), a computer system may operate upon samples of the data set having multiple resolutions. Moreover, some of these samples may overlap other samples; e.g., the computer system may receive or access a lower-resolution sample representing a particular data unit (e.g., a particular portion of the image), and also several higher-resolution samples that together represent the same data unit. If the higher-resolution samples together constitute an overlapping of the lower-resolution sample, then it may be more efficient to omit the processing of the lower-resolution sample, as this may be redundant. Accordingly, it may be more efficient, prior to rendering a sample of a data set representing a particular data unit, to determine whether sufficient higher-resolution samples representing the same data unit are available to warrant skipping the rendering of the lower-resolution sample. Techniques are disclosed herein for making this determination and acting upon it to achieve improved efficiency in the processing of the data set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 is a flowchart illustration of an exemplary method of rendering a data set comprising multiple resolutions of potentially overlapping samples.

FIG. 3 is a pseudocode block comprising computer-executable instructions configured to render a data set comprising multiple resolutions of potentially overlapping samples.

FIG. 10 is a pseudocode block comprising computer-executable instructions configured to render a data set comprising multiple resolutions of potentially overlapping samples.

DETAILED DESCRIPTION

Figure 1A:
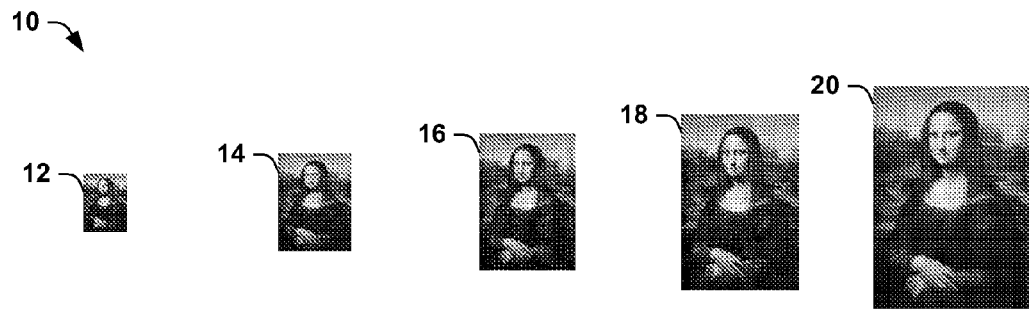
FIG. 1A is an illustration of an exemplary data set comprising multiple resolution representations of an image, each representation scaled according to a constant dot-per-inch resolution.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As noted herein, computer systems are often programmed to process a data set that may represent an object such as an image, a video segment, an audio recording, or various other forms of data. The data set is often represented as a collection of samples that provide data representing portions of the represented object. The samples may represent various sizes of the portions of the object; larger sizes may provide a representation of the object with less data but also with less detail, whereas smaller sizes may provide a representation having more detail but requiring more voluminous data. The resolution of the sample, therefore, may have several ramifications to the size and quality of the data set representing of the object.

It may be advantageous for a computer system to store multiple representations of the object at various resolutions. For example, a very high-resolution image may involve a considerable amount of processing to display as a thumbnail preview, so the computer system may store a downscaled representation of the image at a lower resolution as the thumbnail preview image. In some scenarios, the computer system may retain several or many representations of the same object at various resolutions, e.g., for a map of a geographic region having many relevant levels of zoom, or an audio segment stored at many resolutions and provided to an audio playback device based on the capabilities of the system (a low-fidelity device may be provided a low-resolution audio data set, while a high-fidelity device may be provided a high-resolution audio data set.)

Figure 1B:
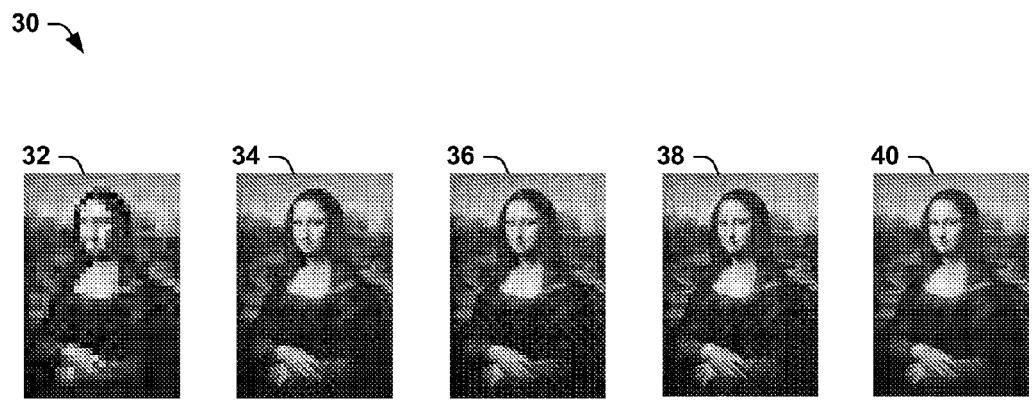
FIG. 1B is an illustration of an exemplary data set comprising multiple resolution representations of an image, each representation scaled equally irrespective of resolution.
Figure 1C:
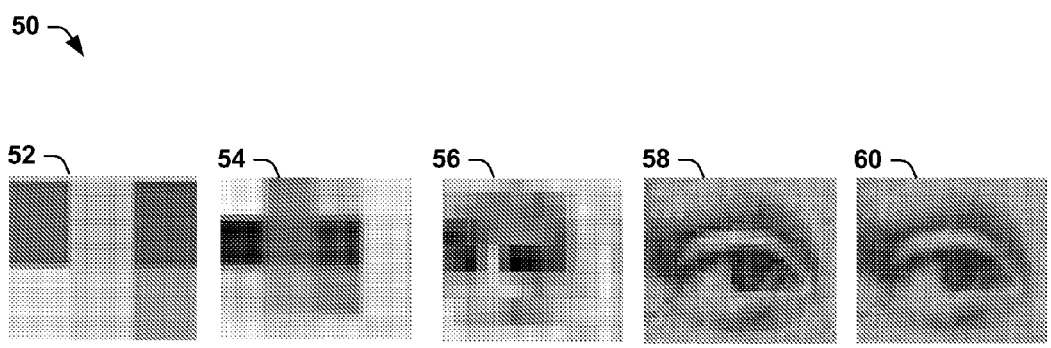
FIG. 1C is an illustration of a data unit comprising a portion of an exemplary data set comprising multiple resolution representations of an image, each data unit scaled equally irrespective of resolution.
Figure 1D:
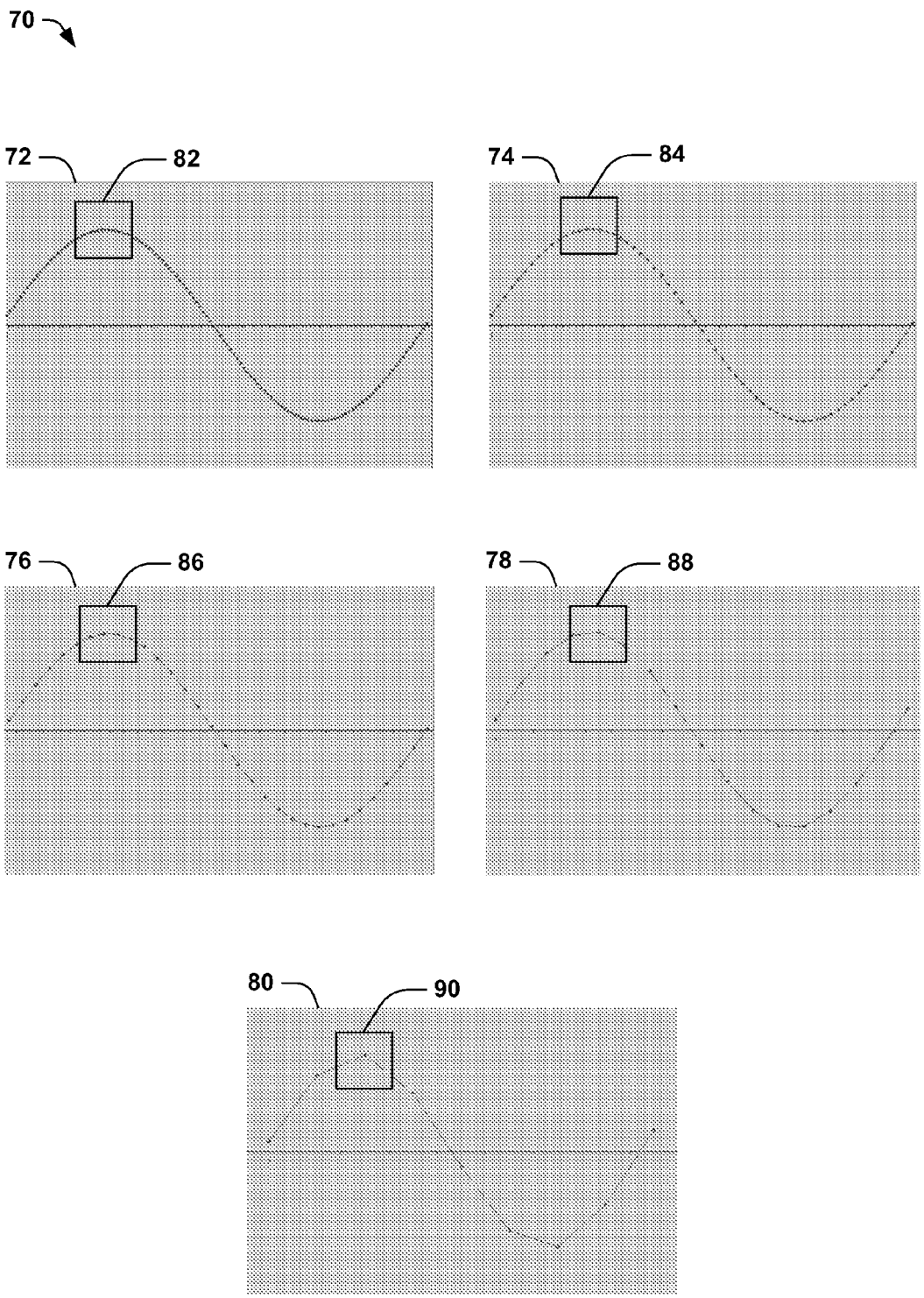
FIG. 1D is an illustration of an exemplary data set comprising multiple resolution representations of an audio waveform, each representation scaled equally irrespective of resolution.

Some examples of this complexity are illustrated in FIGS. 1A-1C, which present various representations of an image, and FIG. 1D, which presents various representations of an audio file. The example 10 in FIG. 1A includes five representations 12, 14, 16, 18, 20 of an image at various resolutions. The lowest-resolution representation 12 may be suitable for providing a small thumbnail depiction of the image. The lowest-resolution representation 12 contains less detail than the second-lowest-resolution representation 14, which may provide more information about the image, but also expands the size of the data comprising the representation. The mid-resolution representation 16 provides more information than the second-lowest-resolution representation 14, but also involves more data to represent the image. In turn, the second-highest-resolution representation 18 provides more information than the mid-resolution representation 16, and the highest-resolution representation 20 provides the most detailed representation of the image in this example 10. These representations are not merely differently sized, but contain different amounts of information. FIG. 1B presents an example 20 of the same representations at an equal scale, where the lowest-resolution representation 32 (equivalent to the lowest-resolution representation 12 comprising the thumbnail preview image in the example 10 of FIG. 1A) is presented as having more information than the second-lowest resolution representation 34 (which is equivalent to the second-lowest-resolution representation 14 in FIG. 1A.) It may be appreciated by contrasting the lowest-resolution representation 32 and the highest-resolution representation 40 that the quality of the image improves as more detail is added, but that the size of the data comprising the data set considerably grows as more information is included.

FIG. 1C presents a similar example 50 of an illustration of a portion of the image in different resolutions. In this example 50, the data unit of the image—the selected portion of the image—is represented at various levels of resolution, where higher-resolution representations present more detail but involve more voluminous data. The lowest-resolution representation 52 represents the illustrated portion of the image with only a few large pixels, while the second-lowest-resolution representation 54 includes more detail by increasing the resolution of the pixels representing the image (in this case, four times as many pixels as in the lowest-resolution representation 52.) The quality of the image continues to improve as the resolution is increased in the mid-resolution representation 56, which again includes four times the pixels of the second-lowest resolution representation 54.

The tradeoff between quality and data volume is not limited to images. FIG. 1D illustrates an exemplary audio sample 70 having a similar variance in resolution among various data representations of the audio waveform. The audio sample is first illustrated as a highest-resolution waveform 72 that provides a smooth representation of the sine wave. A second-highest-resolution waveform 74 provides a somewhat choppier waveform with less resolution, which involves less data storage but also reduces the quality of the audio representation. Even lower-quality but smaller-data-set waveforms are presented in succession in the mid-resolution waveform 76, the second-lowest-resolution waveform 78, and the lowest-resolution waveform 80. The amount of data comprising each audio representation may be appreciated by contrasting the number of samples within a data unit, e.g., at the top of the sine wave. The lowest-resolution waveform 80 only includes one sample in this data unit 90, while the mid-resolution waveform 76 comprises four samples in the data unit 86, and the highest-resolution waveform 82 comprises sixteen samples in the data unit 72. The tradeoff between quality and data size may be differently adjusted for different scenarios; e.g., a high-fidelity audio device may present a noticeable quality improvement between the highest-resolution waveform 72 as compared with the lowest-resolution waveform 82, whereas an audio device with fewer computing resources (e.g., a low-power processor and limited bandwidth) may be unable to process the highest-resolution waveform 72 in real-time, and may be advantageously provided the lowest-resolution waveform 82 for a low-quality but adequate rendering of the audio.

A data set may comprise samples representing portions of the object at various resolutions. As one example, an audio recording may comprise high-resolution samples for more complex or more interesting portions of the audio file (e.g., speech) and low-resolution samples for less complex or less interesting portions of the audio file (e.g., silence.) As another example, an image may have some portions of high detail represented by samples of high resolution, and other portions with low detail represented by samples of low resolution. This may occur where the user is initially presented with low-resolution samples comprising a low-resolution image, requests to zoom in on a portion of the image, and receives higher-resolution samples for the zoomed-in portion. In this example, the data unit representing the zoomed-in portion is represented both by the low-resolution samples originally provided for the image, and by the high-resolution samples provided to satisfy the request to satisfy the zooming. The data set therefore contains overlapping samples for the data set.

The overlapping of samples in a data set may give rise to a computing inefficiency in rendering the data set, where samples are rendered that are redundant with higher-resolution samples for the same data unit. The rendering of the data set from lowest-resolution samples to highest-resolution samples may therefore cause a lower-resolution sample for a data unit to be overlapped by higher-resolution samples for the data unit. This inefficiency may be exacerbated where the data set contains many samples at several resolutions, leading to a considerable amount of unnecessary rendering of lower-resolution samples that are overlapped by higher-resolution samples.

An improved rendering technique may coordinate the rendering of the data set to reduce the inefficiency caused by the unnecessary rendering of lower-resolution samples that are overlapped by higher-resolution samples representing the same data unit. Before rendering a sample representing a data unit, a more efficient technique may endeavor to determine whether the sample is overlapped by higher resolution samples representing the data unit. If the sample is overlapped, then the rendering of the sample may be omitted as redundant with the higher-resolution samples to be rendered for the same data unit. This determination may be made for the samples in each represented resolution of the data set with respect to the higher-resolution samples in the data set, thereby restricting the rendering to the samples that are represented in the final rendering of the data set, and thereby omitting the rendering of samples that will have been overwritten by renderings of the higher-resolution samples representing the same data unit.

Accordingly, a method of rendering a data set comprising multiple resolutions of potentially overlapping samples may be devised to improve the efficiency by omitting the rendering of overlapped samples. FIG. 2 presents an exemplary method 100 in accordance with this technique, wherein the method begins at 102, and for respective samples, the method 100 involves determining whether a sample representing a data unit is not overlapped by higher resolution samples representing the data unit before rendering the sample 104. Having made such a determination prior to rendering the respective samples of the data set, the method 100 accomplishes the rendering of the data set in a more efficient manner, and therefore the method 100 ends at 106.

The exemplary method 100 of FIG. 2 may be understood with reference to the pseudocode block presented in FIG. 3. In this exemplary pseudocode block 110, the samples of the dataset are evaluated in turn for the degree of overlap with higher-resolution samples in the same data set that represent the same data unit, and a low-resolution sample is rendered only if higher-resolution samples do not overlap the low-resolution sample. Having rendered all of the samples that are not overlapped, the pseudocode achieves the rendering of the dataset. It will be appreciated that this pseudocode block 110 is not limited to the syntactic or computing constraints of any particular computer language or system architecture. Rather, the pseudocode block 110 is provided as a high-level representation of how a method of rendering a data set might be implemented in a variety of languages and on a variety of computer systems by those of ordinary skill in the art in accordance with the techniques presented herein. Also, the summation may be conducted according to various techniques, some of which may have advantages with regard to computability. Some particular techniques for performing the summation that may be advantageous are presented herein.

Figure 4:
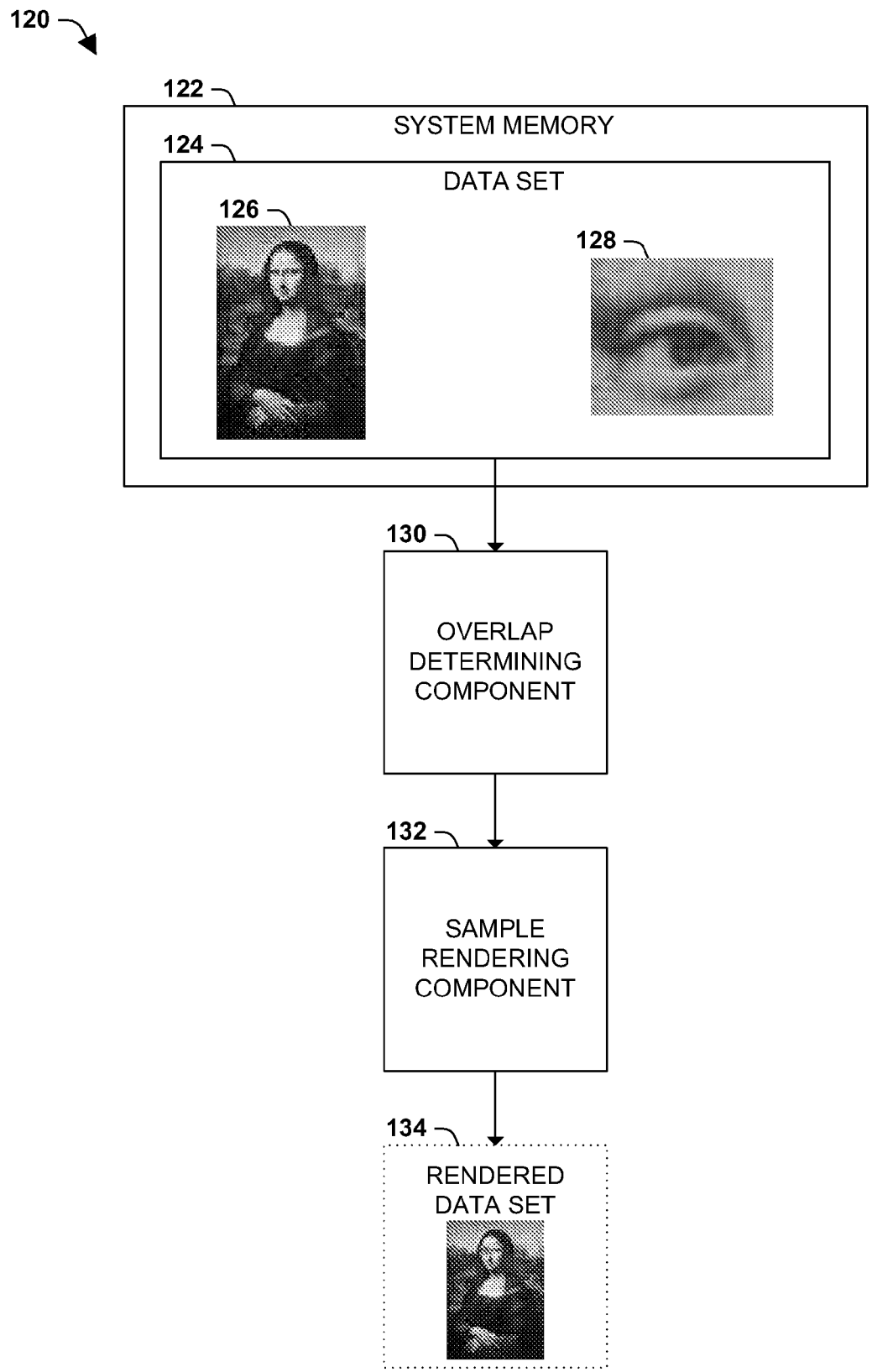
FIG. 4 is a component block diagram of an exemplary system for rendering a data set comprising multiple resolutions of potentially overlapping samples.

The techniques presented herein may also be devised as a system for rendering a data set comprising multiple resolutions of potentially overlapping samples. FIG. 4 presents a component block illustration of an exemplary system 120 configured in this manner, in which the system 120 operates on a data set 124 that may be stored, e.g., in a system memory 122, such as system RAM, a hard disk drive, an optical disk drive, a solid-state storage device, etc. The data set 124 comprises samples of multiple resolutions that are potentially overlapping. In this exemplary system 120, the data set 124 contains two sets of samples: a low-resolution sample set 126 comprising the second-lowest-resolution representation 34 of the image illustrated in FIG. 1B, and a high-resolution sample set 128 comprising the highest-resolution representation 60 of FIG. 1C of a portion of the image. The data unit defined by the portion of the image represented by the high-resolution sample set 128 may overlap the samples of the low-resolution sample set 126 for the same data unit (i.e., the portion of the low-resolution sample set 126 comprising the samples represented in the second-lowest-resolution representation 54 of FIG. 1C.) Therefore, in accordance with the improved rendering techniques disclosed herein, such samples of the low-resolution sample set 126 may be omitted from rendering as having been overlapped by the higher-resolution samples of the high-resolution sample set 128 that represent the same data unit.

The exemplary system 120 of FIG. 4 is configured to implement this technique by comprising an overlap determining component 130, which is configured to determine, for respective samples, whether a sample representing a data unit is overlapped by higher resolution samples representing the data unit before rendering the sample. For example, for the data set 124 of this exemplary system 120, the overlap determining component 130 determines the samples of the low-resolution sample set 126 that are overlapped by the higher-resolution samples of the high-resolution sample set 128 for the same data unit. The overlap determining component 130 therefore determines that all of the samples of the low-resolution sample set 126 are to be rendered except for those corresponding to the portion of the data set 124 that is represented by the high-resolution sample set 128, i.e., the pixels shown in the second-lowest-resolution representation 54 of the data unit illustrated in FIG. 1C. The overlap determining component 130 also determines that all of the samples of the second samples set 128 are to be rendered, as no overlapping samples of even higher resolution are available for the same data unit. The exemplary system 120 also comprises a sample rendering component 134, which is configured to render samples determined by the overlap determining component 130 that are not overlapped by higher-resolutions samples representing the data unit. The sample rendering component 134 therefore renders all of the samples of the low-resolution sample set 124 except for the samples illustrated in the second-lowest-resolution representation 54 of the data unit in FIG. 1C, and also renders all of the samples of the high-resolution sample set 128. Having cooperated in selecting and rendering the samples of the data set 124, the overlap determining component 130 and the sample rendering component 132 thereby produce a rendering 134 of the data set 124 with improved efficiency.

The techniques disclosed herein, and embodiments thereof (including as the exemplary method 100 of FIG. 2, the exemplary pseudocode block 110 of FIG. 3, and the exemplary system 120 of FIG. 4) may be implemented in many variations that may present advantages and/or reduce disadvantages with respect to other implementations and embodiments. As one example, these rendering techniques are not limited to data sets representing sensory objects, such as images, video, and audio. For example, the data set may comprise input from a sensor device, such as an X-ray crystallography device, which may capture X-ray data relating to the positions of atoms in a crystalline sample. The device may capture data about various portions of the sample at various resolutions in order to provide more detailed (yet voluminous) data about portions of the crystalline sample that are of more interest to the operators of the device. The "rendering" of such data may not necessarily involve displaying the X-ray data in visual form, but may relate to the processing of samples captured during various scans of the crystalline sample, wherein the lower-resolution data may be omitted from computational analysis if higher-resolution data yielded in a higher-resolution scan of the same portion of the crystalline sample is available. Persons of ordinary skill in the art may be capable of applying these rendering techniques to many types of data sets having multiple-resolution and potentially overlapping samples in order to achieve the advantages described herein.

Figure 5:
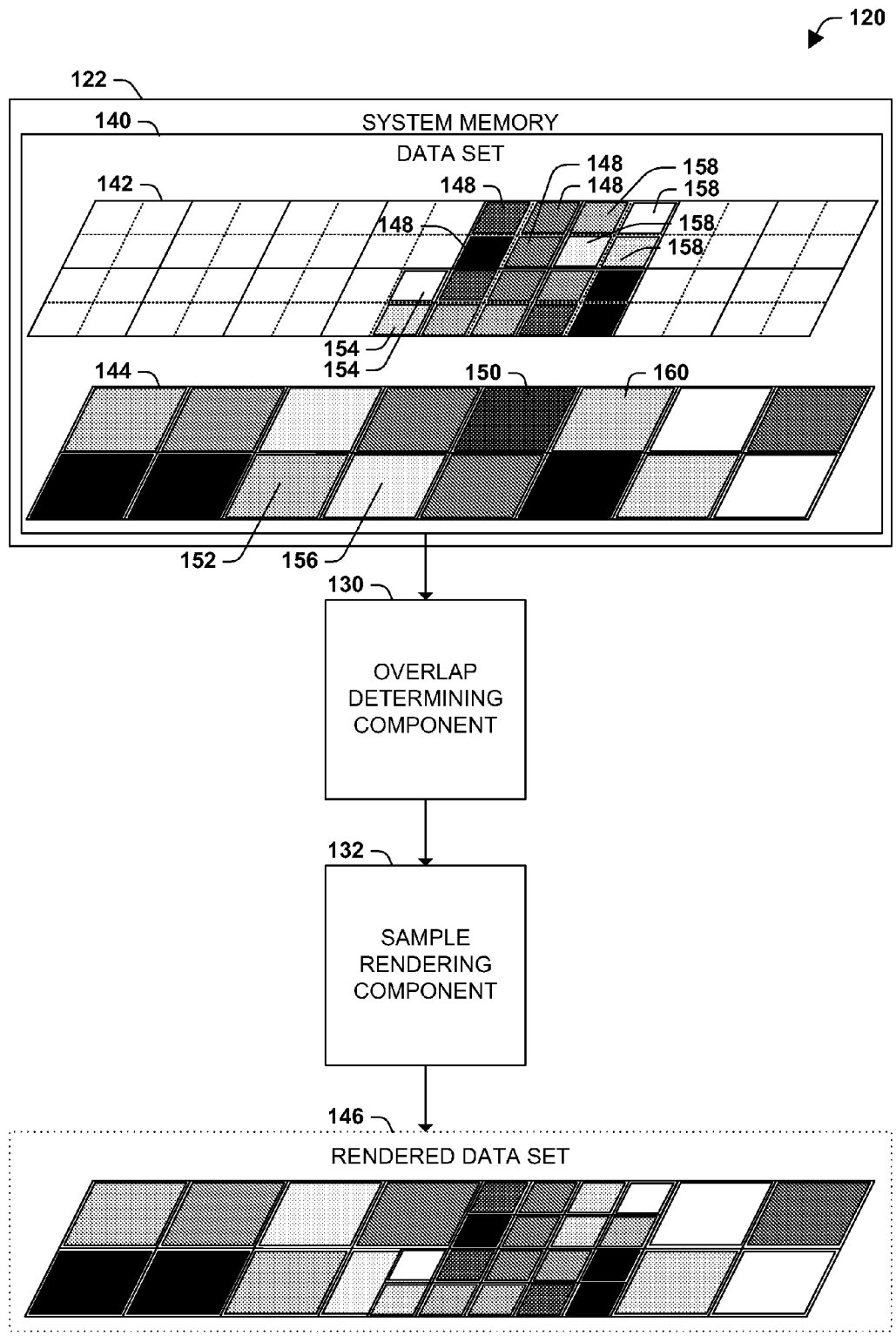
FIG. 5 is another component block diagram of an exemplary system for rendering a data set comprising multiple resolutions of potentially overlapping samples.

FIG. 5 presents another exemplary application of the exemplary system 120 applied to a data set 140, again stored in a system memory 122 and operated upon by an overlap determining component 130 and a sample rendering component 132 to produce a rendered data set 146 in accordance with the techniques discussed herein. This example is presented to depict the operation of the system 120 on the data set 140 at the per-sample and per-data-unit level. This example again involves a data set 140 comprising a low-resolution sample set 144 having a comparatively low resolution, and a high-resolution sample set 146 having a comparatively high resolution, but only representing a portion of the data set 140. The rendered data set 146 therefore has varying regions of detail based on the composite of data units represented by the lower-resolution low-resolution sample set 144 and the higher-resolution high-resolution sample set 146.

The examination of three data units processed by the exemplary system 120 in FIG. 5 may provide an understanding of the techniques discussed herein. The exemplary system 120 again operates on the data set by determining whether a sample representing a data unit is overlapped by higher-resolution samples representing the data unit. A first data unit is represented in the low-resolution sample set 144 as a single sample 150 (in this case, a 100% black pixel.) Before rendering the single sample 150 of the low-resolution sample set, the overlap determining component determines whether the sample is overlapped by higher-resolution samples representing the same data unit. The overlap determining component 130 therefore examines the high-resolution sample set 142, and finds that the single sample 150 of the low-resolution sample set 144 is 100% overlapped by four samples 148 of the seconds sample set 142. Therefore, the single sample 150 is not rendered by the sample rendering component 132. A second data unit is also represented in the low-resolution sample set 144 as a single sample 152 (in this case, a medium-gray pixel.) In this case, the overlap determining component 130 determines that no samples in the high-resolution sample set 142 overlap the single sample 152 of the low-resolution sample set 144, so the sample rendering component 132 renders the single sample 152 to form the rendered data set 146. A third data unit is also represented in the low-resolution sample set 144 as a single low-resolution sample 156 (in this case, a light-gray pixel.) However, the overlap determining component 130 determines that only two samples 154 of the high-resolution sample set 142 overlap the low-resolution sample 156 of the low-resolution sample set 144 for the second data unit, and the sample rendering component 132 renders the low-resolution sample 156 as part of the rendered data set 146. The system 120 continues to render samples based on the overlap determination until the rendered data set 146 is complete.

Figure 6:
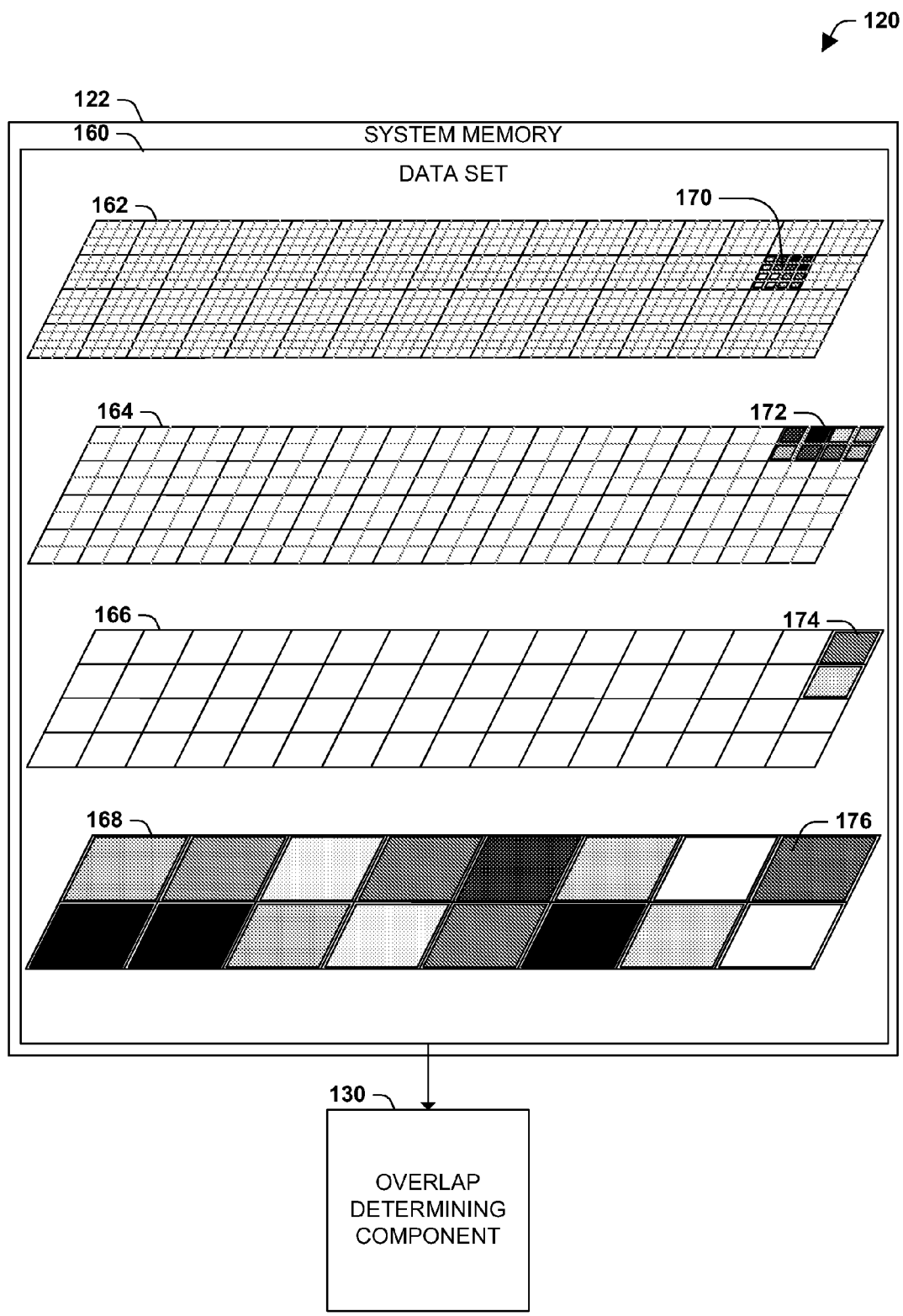
FIG. 6 is a component block diagram of a portion of an exemplary system for rendering a data set comprising multiple resolutions of potentially overlapping samples.

It will be appreciated that these techniques, including the exemplary system 120 of FIG. 5, may be applied to data sets samples comprising more than two levels of resolution. One such example is illustrated in FIG. 6, which illustrates a component block diagram of a portion 120 of an exemplary system for rendering a data set comprising multiple resolutions of potentially overlapping samples. In this system, the overlap determining component 130 is applied to a data set 160 stored in a system memory 122 comprising samples from four levels of resolution: a highest-resolution sample set 162, a second-highest-resolution sample set 164, a second-lowest-resolution sample set 166, and a lowest-resolution sample set 168, where each such sample set is devised with twice the resolution of the adjacent lower-resolution sample set, and with half of the resolution of the adjacent higher-resolution sample set. The overlap determining component 130 may be configured to process the samples of each sample set in turn, and for a particular data unit, the overlap determining component 130 may determine the overlap with respect to the higher-resolution samples representing the data unit. For example, the overlap determining component 130 may be directed to render the data unit represented by the single sample 176 in the lowest-resolution sample set 168. This single sample 176 is only 50% overlapped by two samples 174 comprising the second-lowest-resolution sample set 166. However, the non-overlapped portion of the single sample 176 is also 25% overlapped by the samples 172 of the second-highest resolution set 164, and the remaining 25% of the single sample 176 is overlapped by the sixteen samples 170 of the highest-resolution sample set 162. Accordingly, the single sample 176 of the lowest-resolution sample set 168 is completely overlapped by higher-resolution samples representing the same data unit, and so the overlap determining component 130 omits the rendering of the single sample 176. However, the overlap determining component 130 in this exemplary system 120 is configured to evaluate the single sample 176 in light of all of the respective higher-resolution sample sets, thereby providing a more accurate overlap determination than by examining only the adjacent higher-resolution sample set. It will be appreciated that one of the samples of the second-lowest-resolution sample set 166 is in turn completely overlapped by some of the samples in the second-highest-resolution sample set 164, and thus will also not be rendered.

Some variations of aspects this technique may be appreciated with reference to the example of FIG. 5. As noted in the examples of FIGS. 1A-1C, these techniques may be applied to data sets comprising more than two levels of resolution. One such aspect that may be implemented in various manners relates to the rendering of high-resolution samples that only partially overlap a low-resolution sample representing the same data unit. In this scenario (described with reference to the example of FIG. 5), the sample rendering component 132 may be variably configured with respect to the rendering of the higher-resolution samples. As one example, and as shown in FIG. 5, the two high-resolution samples 154 of the high-resolution sample set 142 may be rendered over the rendering of the low-resolution sample 156 in the rendered data set 146; while this produces some redundant rendering of the overlapped portion of the low-resolution sample 156, the rendered data set 146 benefits from the enhanced resolution provided by the additional rendering of the two high-resolution samples 154. Alternatively, the sample rendering component 132 may be configured to omit the rendering of the two high-resolution samples 154 of the high-resolution sample set 142 in order to conserve computing resources. As another alternative, the sample rendering component 132 may endeavor to render only the portion of the low-resolution sample 156 that is not overlapped by the higher-resolution samples 154. Other alternatives may be devised by those of ordinary skill in the art for rendering samples that are partially overlapped, but not so substantially overlapped as to omit the rendering of the sample.

Yet another aspect of these techniques that may be implemented in various manners (again described with reference to FIG. 5) relates to the relative processing of the overlap determining component 130 in determining the samples to be rendered and the sample rendering component 132 in rendering the determined samples. As one example, the components may operate in per-sample sequence, wherein the overlap determining component 130 determines whether a sample representing a data unit is overlapped by higher-resolution samples representing the data unit, and the sample rendering component 132 then renders the sample if it is not overlapped. This configuration may be organized in alternating sequence (e.g., where the overlap determining component 130 waits for the sample rendering component 132 to complete the rendering of a sample before moving on to the determination for the next sample), in a pipelined manner (e.g., where the overlap determining component 130 performs a determination of a second sample while the sample rendering component 132 renders the first sample), and/or in an asynchronous manner (e.g., where the overlap determining component 130 fills a queue with samples to be rendered, which the sample rendering component 132 consumes on an unrelated schedule.) In this configuration, the rendering of the data set comprises rendering a sample representing a data unit upon determining whether the sample is not overlapped by higher resolution samples representing the data unit. By contrast, as another example, the components may operate in per-resolution-level sequence, wherein the overlap determining component 130 determines the samples to be rendered for the samples of one resolution, and the sample rendering component 132 renders all such identified samples together. This configuration may cause more waiting by the sample rendering component 132, but may benefit from burst-mode access to system memory for sequentially stored sample data. In yet another example, the overlap determining component 130 may complete the overlap determination for all samples in the data set, and the sample rendering component 132 may then render all samples determined by the overlap determining component 130 not to be overlapped. In this configuration, the rendering of the data set comprises rendering the data set after determining the samples that are not overlapped by higher resolution samples representing the data unit. This example features even more delay in rendering the samples, but may benefit by avoiding shared data access to the sample data by simultaneously operating components and the typical problems caused thereby (e.g., write-after-read data hazards.) Those of ordinary skill in the art may be able to devise many such configurations of the cooperating relationship of the overlap determining component 130 and the sample rendering component 132 while applying the techniques discussed herein.

Yet another aspect that may be implemented in various manners relates to the various resolutions of the samples comprising the data set. In some embodiments of these techniques, a resolution of the data set may have an integer multiple with respect to adjacent resolutions (e.g., the next-highest resolution or the next-lowest resolution) of the data set.

The examples presented in FIG. 1C, FIG. 1D, and FIG. 5 include sample sets of various resolutions, where one sample set comprises twice the resolution of the next-lower-resolution sample set. For example, the low-resolution sample set 144 of FIG. 5 comprises samples of twice the resolution of the high-resolution sample set 146, where each lower-resolution sample correlates with a 2×2-block of higher-resolution samples. Thus, the resolutions of the samples in these examples have an integer multiple—specifically, a multiple of two—with respect to the next-higher resolution and the next-lower resolution. Other multiples are possible; e.g., a multiple of three may be used, wherein a data unit may be represented by single lowest-resolution sample, a 3×3 set of mid-resolution samples, a 9×9 set of high-resolution samples, etc. The selection of sample resolutions having an integer multiple may be advantageous for providing relatively simple correlation of samples stored in arrays. For example, in FIG. 5, the low-resolution sample set 144 may comprise a data representation of an 8×2 array, and the high-resolution sample set 142 may comprise a data representation of a 16×4 array. Accordingly, a low-resolution sample at array coordinate [x,y] represents the same data unit as the higher-resolution samples of the high-resolution sample set at array coordinates [2x, 2y], [2x+1, 2y], [2x, 2y+1], and [2x+1, 2y+1]. For example, the single sample 150 present at array coordinate [4, 0] in the low-resolution sample set 144 may be correlated with the four samples 148 of the high-resolution sample set 142 at array coordinates [8, 0], [9, 0], [8, 1], and [9, 1]. Thus, the selection of an integer multiple may provide comparatively simple computational mathematics in the comparison of samples between resolutions. Moreover, each higher-resolution sample will overlap with only one lower-resolution sample.

Figure 7:
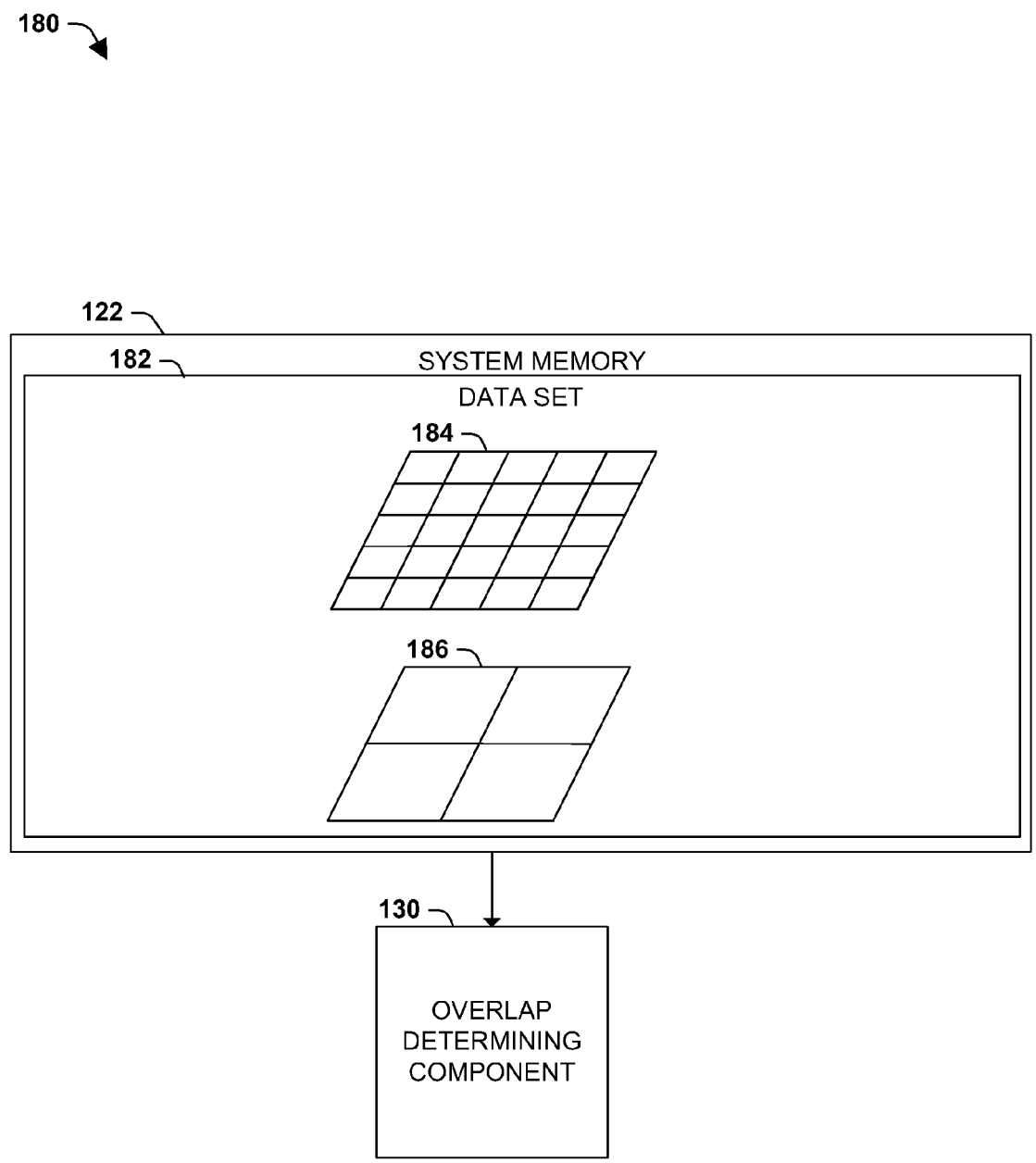
FIG. 7 is a component block diagram of a portion of another exemplary system for rendering a data set comprising multiple resolutions of potentially overlapping samples.

In alternative embodiments, a resolution of the data set may have a non-integer fractional multiple with respect to adjacent resolutions (e.g., the next-highest resolution or the next-lowest resolution) of the data set. One such example 180 is illustrated in FIG. 7, which presents a component block diagram illustrating a portion of a system for rendering a data set comprising multiple resolutions of potentially overlapping samples. The overlap determining component 130 is applied to a data set 182 stored in a system memory 122 that comprises a 2×2 low-resolution sample set 186 and a 5×5 high-resolution sample set 164, where the relationship between the resolutions of the low-resolution sample set 186 and the high-resolution sample set 184 is the non-integer value 2.5. This data set 182 may be more difficult to process for at least two reasons. First, the calculation of the array coordinates of higher-resolution samples representing the same data unit as a lower-resolution sample may involve floating-point computations, which are computationally more difficult than the integer calculation described above. Second, some of the higher-resolution samples overlap more than one lower-resolution sample. For example, the sample of the high-resolution sample set 184 of FIG. 4 at coordinate [3, 0] overlaps both sample [0, 0] and sample [0,1] of the low-resolution sample set 186, and the middle sample of the high-resolution sample set 184 at coordinate [3, 3] overlaps all four samples of the low-resolution sample set 186. The overlap determining component 130 may therefore have to evaluate the overlap of a high-resolution sample with respect to multiple low-resolution samples, thereby creating additional computational complexities. Moreover, partially overlapping high-resolution samples may be more heavily factored into the overlapping determination of the overlap determining component 130 than non-partially-overlapping high-resolution samples, thereby skewing the overlap determination and causing inconsistent determinations that mitigate the efficiency savings of these techniques.

However, the overlap determining component 130 may nevertheless be tasked with rendering data sets comprising multiple resolution samples having a non-integer fractional multiple with respect to adjacent resolutions, and may therefore be configured to apply these techniques in such scenarios. As one example, the overlap determining component 130 may utilize a more complex array coordinate calculation that accounts for partial overlap, e.g., by selecting all high-resolution samples having coordinates between (coordinate*rounddown(multiple)) and ((coordinate+1) *rounddown(multiple)), where rounddown is the rounded-down integer value of the multiple. For example, in FIG. 7, the sample at array coordinate [0, 0] of the low-resolution sample set 186 represents the same data unit as coordinates [0, 0], [0, 1], [0, 2], [1, 0], [1, 1], [1,2], [2, 0], [2,1], and [2,2] of the high-resolution sample set 184—i.e., all having x and y coordinates between (0*2) and ((0+1)*2). Additionally, the overlap determining component 130 may avoid the inconsistent over-factoring of high-resolution samples that partially overlap a low-resolution sample by weighting the overlap contribution based on the degree of overlap. For example, the sample at coordinate [2, 0] of the high-resolution sample set overlaps both the sample at coordinate [0, 0] and the sample at coordinate [1, 0] of the low-resolution sample set. However, this sample only overlaps the low-resolution samples by 50%, and therefore only 50% of the coverage may be included in the overlapping determination (e.g., in the fOverlap computation in the pseudocode block 110 FIG. 3.) Alternatively, the overlap determining component 130 may apply a simplified overlap determination in light of such partial overlapping, e.g., by evaluating a high-resolution sample as overlapping a low-resolution sample only if at least 50% of the high-resolution sample overlaps the low-resolution sample. While less precise, this alternative may ease the computational complexity of determining overlap of high-resolution samples with low-resolution samples having a non-integer fractional resolution relationship. Those of ordinary skill in the art may be able to devise other solutions for comparing non-integer fractional resolution data sets while applying the techniques discussed herein.

Yet another aspect of these techniques that may be implemented in various manners pertains to the performance of the overlap determination. The examples discussed thus far rely on the availability of the samples of the data set, and do not address the memory accesses involved in the overlap determination. For example, the pseudocode block 110 of FIG. 3 implies a two-dimensional accessing of the samples, first in the "for each Sample sample in dataset" iteration, and again in the nested "for each Sample sampleHigherResolution in dataset" iteration. For a large data set comprising 100,000 samples of various resolutions, the overlap determination for the data set involves 100,000*100,000=10,000,000,000 memory accesses. While various memory access techniques (e.g., data caching and burst-mode memory accesses) may reduce the computational burden of these memory accesses, the computational burden of the algorithm may nevertheless negate or overwhelm the efficiency gains realized by these techniques.

A related complication of the algorithm relates to the scenario of streaming data provided in an unordered sequence. A computer system providing access to the data set comprising multiple-resolution samples may be accessed remotely, such as across the internet, and the rendering of the data set may be performed on the client machine. However, since the data packets comprising the samples of the data set may not be transmitted to or received by the client machine simultaneously, the client machine may apply these techniques to render the data set periodically, based on the samples that have thus far been received, while other samples continue to arrive. Moreover, the samples may be received in various and perhaps unpredictable orders. For example, the data packets may be sent via a protocol that does not guarantee transmission sequencing (e.g., UDP/IP transmission); the data packets may be sent from a plurality of servers, such as a server farm, that asynchronously satisfy various portions of the data set service request; or the samples may be sent in response to arbitrary actions of the user (e.g., requests to zoom in on different portions of the image to different resolution levels, even before the lowest-resolution sample set has been completely received.)

Figure 8A:
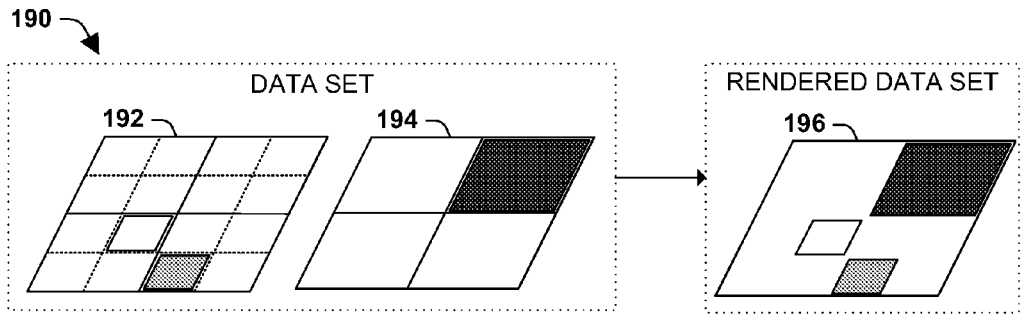
FIG. 8A is an illustration of a multiple resolution data set available at a first time point and a rendered data set rendered therefrom.
Figure 8B:
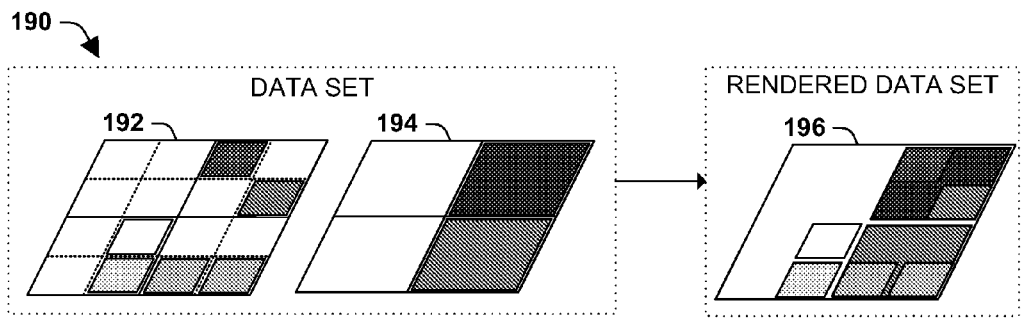
FIG. 8B is an illustration of a multiple resolution data set available at a second time point and a rendered data set rendered therefrom.
Figure 8C:
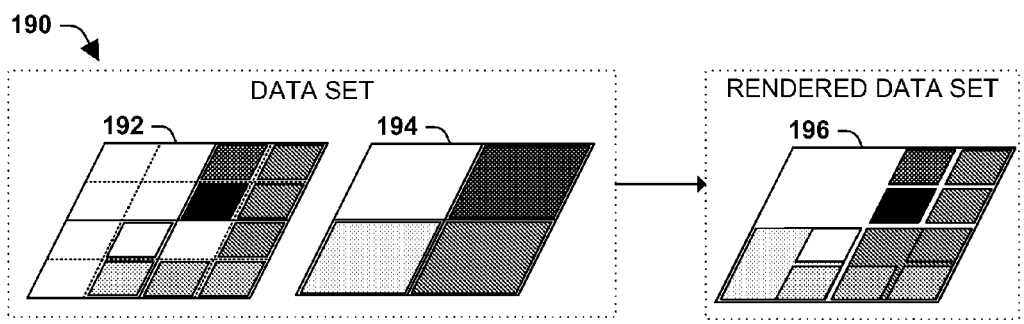
FIG. 8C is an illustration of a multiple resolution data set available at a third time point and a rendered data set rendered therefrom.
Figure 8D:
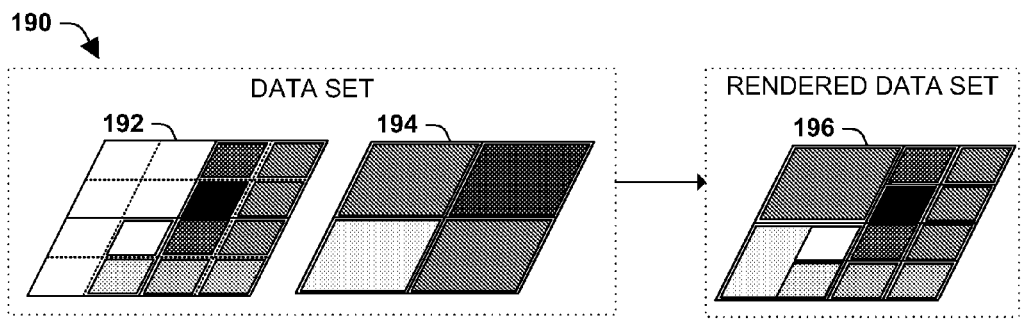
FIG. 8D is an illustration of a multiple resolution data set available at a fourth time point and a rendered data set rendered therefrom.

FIGS. 8A-8D illustrate the rendering of a data set at various time points as additional data is streamed to the computer system and steadily becomes available. In the illustrated example 190 of each figure, the data set comprises a high-resolution sample set 192 and a low-resolution sample set 194, from which a rendered data set 196 is produced. At the first time point, illustrated in FIG. 8A, only a few samples have been made available in both the high-resolution sample set 192 and the low-resolution sample set 194, and all of the samples may be rendered, since no overlap exists. At the second time point, illustrated in FIG. 8B, such that some overlap exists by the samples of high-resolution sample set 192 over the two samples of the low-resolution sample 194. However, since neither of the two low-resolution samples is completely overlapped, both such samples are rendered. The high-resolution samples representing the same data units may then be rendered over the low-resolution samples to add detail to the displayed low-resolution samples, as displayed in this example. Alternatively, the high-resolution samples may be omitted from rendering to economize computing resources (at the expense of some resolution that might be added to the endered image). At the third time point, illustrated in FIG. 8C, all of the high-resolution samples have been received for the data unit represented by the upper-right sample in the low-resolution sample set 194. Accordingly, the upper-right sample of the low-resolution sample set 194 is determined to be completely overlapped and is omitted from rendering, and the high-resolution samples are rendered in its place. Conversely, the high-resolution samples for the data unit represented by the lower-left sample of the low-resolution sample set 192, which were rendered in the second time point of FIG. 8B, are rendered over the low-resolution sample for this data unit, but in an alternative embodiment may be omitted due to the availability of the low-resolution sample for this data unit. FIG. 8D illustrates a similar omission from rendering, at a fourth time point, of the lower-right sample of the low-resolution sample set 194 due to the availability of all overlapping samples from the high-resolution sample set 192 for the same data unit, and also illustrates the rendering of the lower-left and upper-left low-resolution samples that are not completely overlapped by high-resolution samples, along with the rendering of high-resolution samples over the low-resolution samples that are not fully overlapped.

An evaluation of the streaming data set examples of FIGS. 8A-8D indicates that the periodic rendering of the streaming data set may involve the repetitive comparison of samples in making many overlapping determinations. Especially where data sets are very large or not very dynamic (e.g., where new data is infrequently received, such as over a low-bandwidth connection), the repetitive comparisons may be inefficient, and may apply a great amount of computing resources to needlessly redundant computations.

Refinements of these techniques may be devised to reduce the computational demands involved in the overlapping determinations. As one example, the computer system may prepare a sample map for respective resolutions represented in the data set, where a sample map for a respective resolution provides information about the samples of the resolution that is pertinent to the overlapping determination. For example, the sample map may comprise an array of binary flags for the samples comprising the resolution of the represented object, where the binary flags for a sample representing a data unit indicate whether the sample is available and whether the sample is overlapped by higher-resolution samples for the same data unit. If the sample maps are prepared to represent the data set, and are kept in synchrony with the dynamic availability of the samples, then the overlapping determination for a sample may involve consulting the sample map, rather than recalculating the overlap determination upon each rendering of the data set.

Accordingly, the techniques provided herein may involve preparing a sample map for respective resolutions indicating availability of samples of the resolution. Where such a sample is available, the overlap determining for a sample representing a data unit may comprise examining at least one higher resolution sample map to determine availability of higher resolution samples representing the data unit. The preparation and use of such a sample map may facilitate the computational burden of the overlapping determination during the rendering of the data set.

Figure 9A:
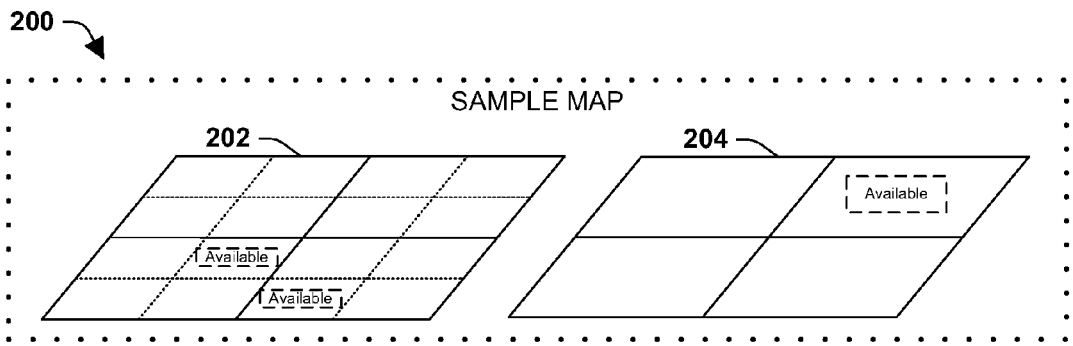
FIG. 9A is an illustration of a sample set at a first time point pertaining to the data set illustrated in FIG. 8A.
Figure 9B:
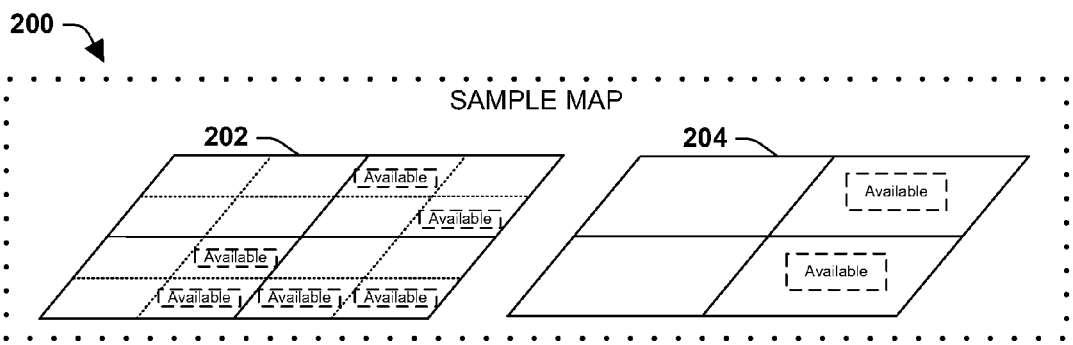
FIG. 9B is an illustration of a sample set at a second time point pertaining to the data set illustrated in FIG. 8B.
Figure 9C:
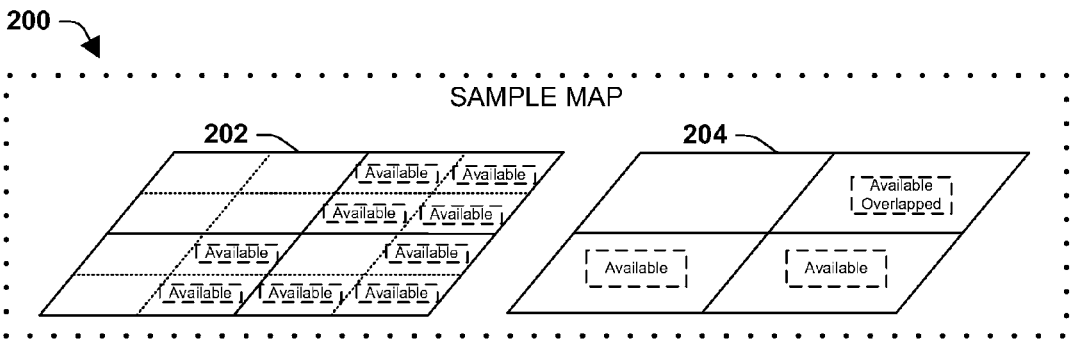
FIG. 9C is an illustration of a sample set at a third time point pertaining to the data set illustrated in FIG. 8C.
Figure 9D:
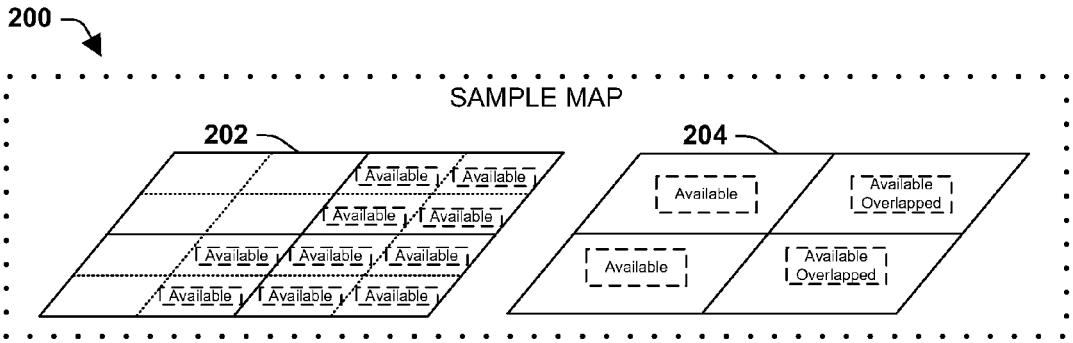
FIG. 9D is an illustration of a sample set at a fourth time point pertaining to the data set illustrated in FIG. 8D.
Figure 11:
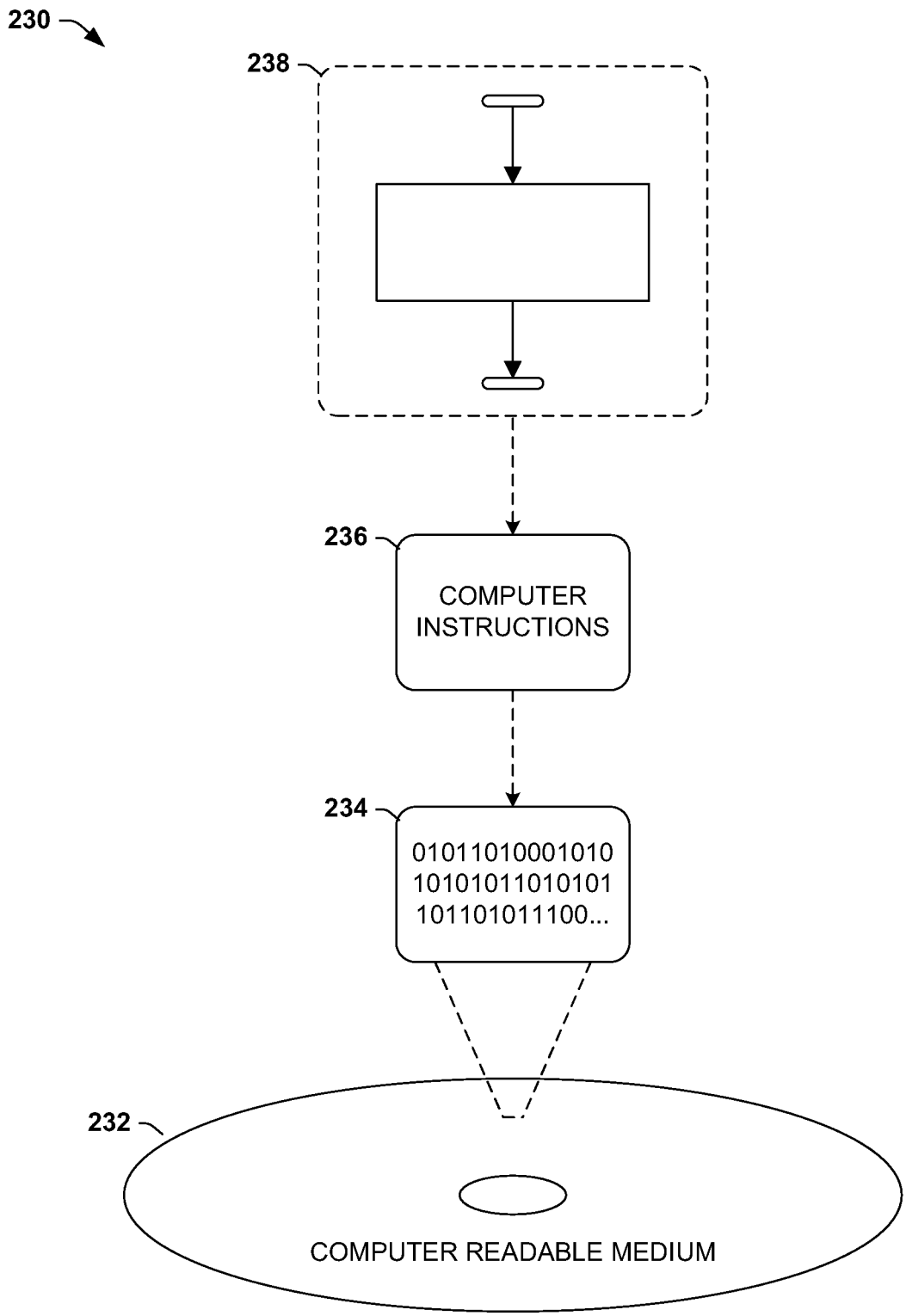
FIG. 11 is an illustration of a computer-readable medium comprising processor-executable instructions configured to perform a method of rendering a data set comprising multiple resolutions of potentially overlapping samples.

FIGS. 9A-9D illustrate some sample maps that may be prepared in this manner and used for overlap determination. Each example 200 of FIGS. 9A-9D illustrates a sample map for the corresponding data set in an example 190 illustrated in FIGS. 8A-8D pertaining to the receipt of samples of a multiple-resolution data set in a non-simultaneous manner and in an arbitrary order, as may characterize a streaming data embodiment of these techniques. Accordingly, the example 200 in each of FIGS. 9A-9D comprises a high-resolution sample map 202 and a low-resolution sample map 204 indicating the availability of samples in each resolution. The overlap determination for each time point may therefore operate on the availability information provided in the sample maps, without reference to the actual samples or the values represented thereby. In FIG. 9A, the high-resolution sample map 202 indicates that two high-resolution samples are available, while the low-resolution sample map 204 indicates that one low-resolution sample is available. Determining the overlapping of the low-resolution sample in the low-resolution sample map 204 involves examining the high-resolution sample map 202, and, finding no overlapping high-resolution samples, concluding that the low-resolution sample is not overlapped and is to be rendered. Similarly, at the second time point illustrated in FIG. 9B, overlap determinations may be made for the samples in the low-resolution sample set 204 by examining the high-resolution sample set 202, which again produces a conclusion that the low-resolution samples are not overlapped and are to be rendered. By contrast, in the example 200 illustrated in FIG. 9C (corresponding to the data set in the example 190 of FIG. 8C) of sample maps at a third time point, the overlap determination for the low-resolution sample in the upper-right portion of the low-resolution sample set 240 involves examining the high-resolution sample map 202, finding four samples overlapping the low-resolution sample, and determining that the low-resolution sample is overlapped by high-resolution samples of the same data unit and is to be omitted from rendering.

The availability information stored in sample map may also be used for other determinations. For example, and as illustrated in the example 190 of FIG. 8B, the computer system may be configured to omit the rendering of high-resolution samples corresponding to a data unit for which a low-resolution sample is already rendered. The sample maps may also be used for this determination by examining lower-resolution sample maps in order to determine whether to render a higher-resolution sample. For example, in FIG. 8B, the high-resolution sample set 192 comprises two samples in the lower-right quadrant corresponding to the data unit represented by the lower-right sample of the lower-resolution sample set 194. While evaluating these high-resolution samples, the computer system may examine the low-resolution sample map 204, and may determine that a lower-resolution sample is already to be rendered for this data unit. The computer system may therefore omit the rendering of these two higher-resolution samples, thereby producing the rendered data set 196 illustrated in FIG. 8B. Those of ordinary skill in the art may find other uses of the availability information stored in the sample maps while implementing the techniques discussed herein.

The preparation and use of sample maps may be included in any embodiments of the techniques described herein. As one example, a method of rendering a data set comprising multiple resolutions of potentially overlapping samples (such as the exemplary method 100 of FIG. 2) may include preparing a sample map for respective resolutions indicating availability of samples of the resolution, and may complete the overlap determining for a sample representing a data unit by examining at least one higher resolution sample map to determine availability of higher resolution samples representing the data unit. As another example, an exemplary system for rendering a data set comprising multiple resolutions of potentially overlapping samples (such as the exemplary system 120 of FIG. 4) may include a sample map component configured to generate sample maps, respective sample maps indicating availability of samples of the resolution, and the overlap determining component may be configured to determine overlapping for a sample of a resolution by examining at least one higher resolution sample map to determine availability of higher resolution samples representing the data unit. Other embodiments for preparing and using the sample maps in the rendering of such data sets may be devised by those of ordinary skill in the art while implementing the techniques discussed herein.

The preparation of sample maps and use in the overlap determination may be implemented in various manners that may present advantages and/or mitigate disadvantages with respect to other implementations. One such variation relates to the timing of the preparation of the sample map in relation to the receipt of samples (e.g., in a streaming data scenario) and to the rendering of the data set. In one embodiment, the sample map may be allocated when the data set is initialized, and may be updated upon receipt of each sample. In another embodiment, the sample map may be prepared during the rendering of the data set, and may be stored for future renderings of the data set (e.g., as a cached record of the overlap determinations for the data set.) These embodiments may be advantageous where the rendering occurs more frequently than the receipt of new samples, wherein periodically updating the sample map may facilitate the frequent rendering by reducing redundant overlapping determinations. This embodiment may also be advantageous where the request for rendering is to be fulfilled with low latency, i.e., where the performance of the system calls for efficient rendering. In a third embodiment, the sample map may be prepared on a just-in-time basis prior to the rendering of the data set. This embodiment may be more useful where updates are frequently received, or where the updating of the data set occurs more frequently than the rendering. Such scenarios may benefit from the just-in-time rendering by dispensing with ongoing maintenance of the sample maps that may be cumbersome in light of voluminous updates to the data set, and by relying less heavily on cached determinations that may quickly become stale. Those of ordinary skill in the art may be able to devise other techniques for timing the preparation of the sample map while implementing the techniques disclosed herein.

Another variable aspect of the preparation and use of the sample set pertains to the expiration of samples and removal from of a sample from the data set. A data set comprising multiple-resolution samples may continue to grow as the user accesses various higher-resolution portions of the data set. The data set grows too large and begin taxing the resources of the computer system, including the complexity of the overlap determinations for the many samples of the data set. Therefore, it may be advantageous to prune the data set of less interesting samples. For example, the computer system may remove a sample from the data set upon determining that the sample is overlapped by higher-resolution samples for the same data unit. As another example, the computer system may remove samples from the data set representing a zoomed-in portion of an image that the user has not accessed in a while. Accordingly, the sample map may be updated upon removing a sample representing a data unit from the data set to indicate the unavailability of the sample.

A third variable aspect of the preparation and use of the sample set pertains to the information stored in the sample set. In addition to storing information about the availability or unavailability of samples in the sample set for various resolutions, the sample maps may also indicate whether a sample representing a data unit is overlapped by higher resolution samples representing the data unit. For example, in FIG. 9C, the low-resolution sample map 204 may indicate the availability of three low-resolution samples, and may also be configured to indicate that the top-right sample is overlapped by high-resolution samples in the high-resolution sample set 202. This variation allows the system to store the results of the overlap determination, such that overlapping determinations with respect to the sample may involve examining the entry in the sample map for the sample, and may not involve examining the sample maps of samples of other resolutions. This configuration may reduce the redundant calculation of the overlapping determination during successive renderings of the data set.

A sample map of this nature may be updated when a sample representing a data unit becomes available; in response, the computer system may perform the overlap determination for the sample (e.g., by consulting the availability information in the sample maps representing higher resolutions) and may store in the sample map an indication of the overlapping of the sample by higher resolution samples representing the same data unit. Thus, the computer system may process the receipt of a new sample by performing the overlapping determination and storing the result of the determination in the sample map along with the indication of the availability of the sample. The computer system may also process the availability of a new sample by recalculating the overlapping determination for the lower-resolution samples that the new sample may overlap. Accordingly, the computer system may be configured, upon receiving a sample representing a data unit, to update at least one lower resolution sample map to indicate overlapping by the sample of lower resolution samples representing the data unit. Additionally, if the computer system is configured to prune the data set of less useful information in light of a growing data set size, then the removal of a sample from the data set may affect a previous determination that one or more lower-resolution samples that were overlapped by the sample. Thus, the sample map may be configured, upon a sample representing a data unit being removed from the data set, to update at least one lower resolution sample map to indicate overlapping without the sample of lower resolution samples representing the data unit. This updating permits the sample map to retain correct overlap determinations based on the information in the current data set. Those of ordinary skill in the art may be able to store and advantageously utilize other information as part of the sample maps while implementing the techniques disclosed herein.

An exemplary implementation is illustrated in FIG. 10, which presents a pseudocode block 210 comprising computer-executable instructions configured to perform the techniques described herein, such as the exemplary method 100 of FIG. 2. It will again be appreciated that this pseudocode block 210 is not limited to the syntactic or computing constraints of any particular computer language or system architecture. Rather, the pseudocode block 210 is provided as a high-level representation of how a method of rendering a data set might be implemented in a variety of languages and on a variety of computer systems by those of ordinary skill in the art in accordance with the techniques presented herein. Also, it will be appreciated that these pseudocode blocks are written for ease of understanding the concepts provided therein, and may not represent the most efficient, robust, or feature-rich embodiments that may be devised in accordance with the techniques presented herein.

The exemplary pseudocode block 210 of FIG. 10 is one exemplary embodiment of the techniques presented herein. It will be appreciated that this embodiment includes some of the advantages that may be achievable in some variations, e.g., the capability of discarding data units from the data set, and the comparatively efficient array indexing mechanism that may be achieved where the data sets have resolutions of integer multiples (in this case, an integer multiple of two.) Other variations may be available that better achieve these advantages, and/or that achieve other advantages and/or reduce disadvantages, with respect to this and other embodiments of these and other techniques.

The techniques discussed herein may also be embodied as a computer-readable medium comprising processor-executable instructions configured to generate an aggregated user profile as discussed herein. An exemplary computer-readable medium that may be devised in these ways is illustrated in FIG. 10, wherein the embodiment 230 comprises a computer-readable medium 232 (e.g., a CD-R, DVD-R, or a platter of a hard disk drive), on which is encoded computer-readable data 234. This computer-readable data 234 in turn comprises a set of computer instructions 236 configured to operate according to the principles set forth herein. In one such embodiment, the processor-executable instructions 236 may be configured to perform a method 238 of rendering a data set comprising multiple resolutions of potentially overlapping samples, such as the exemplary method 100 illustrated in the flowchart of FIG. 2. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of rendering a presentation, comprising at least one data unit, of a data set comprising multiple resolutions of samples respectively corresponding to a data unit of the presentation on a device having a processor, the method comprising:
   executing on the processor instructions configured to:
      for respective resolution levels:
         generate a sample map indicating whether, for respective data units of the presentation, samples of the data unit at the resolution level are available and not overlapped by samples of the data unit at a higher resolution level; and:
      for respective data units of the presentation, rendering into the presentation at least one sample of the data unit that, according to the sample map for the resolution level, is available and not overlapped by samples of the data unit at higher resolution levels.

2. The method of claim 1, the data set selected from a data set type set comprising:
   an audio data set comprising audio recordings of different audio resolution levels,
   an image data set comprising images of different image resolutions,
   a video data set comprising video recordings of different video resolutions, and
   a sensor data set comprising sensor data subsets of different sensor resolutions.

3. The method of claim 1, the resolutions of the data set having an integer multiple with respect to adjacent resolutions of the data set.

4. The method of claim 3, the resolutions of the data set having a non-integer fractional multiple with respect to adjacent resolutions of the data set.

5. The method of claim 1, comprising: upon removing a sample representing a data unit from the data set, updating the sample map for the resolution of the sample to indicate an unavailability of the sample.

6. The method of claim 1, the sample map indicating whether a sample representing a data unit is overlapped by higher resolution samples representing the data unit.

7. The method of claim 6, comprising: upon a sample representing a data unit becoming available, updating the sample map to indicate overlapping of the sample by higher resolutions samples representing the data unit.

8. The method of claim 6, comprising: upon a sample representing a data unit becoming available, updating at least one lower resolution sample map to indicate overlapping by the sample of lower resolution samples representing the data unit.

9. The method of claim 8, comprising: upon removing a sample representing a data unit from the data set, updating at least one lower resolution sample map to indicate overlapping without the sample of lower resolution samples representing the data unit.

10. A device that renders a presentation of at least one data unit of a data set comprising multiple resolutions of samples respectively corresponding to a data unit of the presentation, the device comprising:
- a processor; and
- a memory storing instructions that, when executed by the processor, cause the device to:
  - for respective resolution levels, generate a sample map indicating whether, for respective data units of the presentation, samples of the data unit at the resolution level are available and not overlapped by samples of the data units at a higher resolution level;
  - determine, according to the sample maps for respective resolution levels and for respective data units, whether at least one sample representing a data unit is available and not overlapped by samples of the data unit at higher resolution levels; and
  - render into respective data units of the presentation at least one sample determined to be available and not overlapped by higher resolutions samples representing the data unit.

11. The device of claim 10, the data set selected from a data set type set comprising:
- an audio data set comprising audio recordings of different audio resolution levels,
- an image data set comprising images of different image resolutions,
- a video data set comprising video recordings of different video resolutions, and
- a sensor data set comprising sensor data subsets of different sensor resolutions.

12. The device of claim 10, the instructions configured to, upon a sample representing a data unit becoming available, update the sample map for the resolution level of the sample to indicate overlapping of the sample by higher resolutions samples representing the data unit.

13. The device of claim 10, the instructions configured to, upon a sample representing a data unit becoming available, update at least one lower resolution sample map to indicate overlapping by the sample of lower resolution samples representing the data unit.

14. The device of claim 13, the instructions configured to, upon removing a sample representing a data unit from the data set, update at least one lower resolution sample map to indicate overlapping without the sample of lower resolution samples representing the data unit.

15. The method of claim 1, generating the sample map of a resolution level comprising:
- for respective unavailable samples at the resolution level, indicating an unavailability of the sample at the resolution level for the data unit; and
- for respective available samples at the resolution level:
  - identifying an overlap proportion of the sample by samples at higher resolution levels;
  - comparing the overlap proportion of the sample to an overlap threshold;
  - upon determining that the overlap proportion does not exceed the overlap threshold, identifying the sample as available and not overlapped; and
  - upon determining that the overlap proportion exceeds the overlap threshold, identifying the sample as available and overlapped.

16. The method of claim 1, the instructions configured to, upon determining an overlapping of a sample at a resolution levels by samples at higher resolution levels:
- remove the sample, and
- indicate the sample as unavailable in the resolution map for the resolution level.

17. The method of claim 1, the instructions configured to, upon identifying a sample at a resolution level that has not been recently rendered into a presentation:
- remove the sample, and
- indicate the sample as unavailable in the resolution map for the resolution level.

18. The device of claim 10, the instructions configured to generate the sample map of a resolution level by:
- for respective unavailable samples at the resolution level, indicating an unavailability of the sample at the resolution level for the data unit; and
- for respective available samples at the resolution level:
  - identifying an overlap proportion of the sample by samples at higher resolution levels;
  - comparing the overlap proportion of the sample to an overlap threshold;
  - upon determining that the overlap proportion does not exceed the overlap threshold, identifying the sample as available and not overlapped; and
  - upon determining that the overlap proportion exceeds the overlap threshold, identifying the sample as available and overlapped.

19. The device of claim 10, the instructions configured to, upon determining an overlapping of a sample at a resolution levels by samples at higher resolution levels:
- remove the sample, and
- indicate the sample as unavailable in the resolution map for the resolution level.

20. A device that renders a presentation of a data set comprising multiple resolutions of potentially overlapping samples, the device comprising:
- a processor; and
- a memory storing instructions that, when executed by the processor, cause the device to:
- for respective resolution levels:
  - generate a sample map indicating whether, for respective data units of the presentation, samples of the resolution level are available and not overlapped by samples of the data unit at a higher resolution level; and
  - for respective data units of the presentation, render into the presentation at least one sample of the data unit that, according to the sample map for the resolution level, is available and not overlapped by samples of the data unit at higher resolution levels.

* * * * *